United States Patent
Awwad et al.

(10) Patent No.: US 11,512,986 B2
(45) Date of Patent: Nov. 29, 2022

(54) FIBER PHASE SENSING USING A LADDER TOPOLOGY

(71) Applicant: Nokia Solutions and Networks Oy, Espoo (FI)

(72) Inventors: Elie Awwad, Antony (FR); Christian Dorize, Le Mesnil-Saint-Denis (FR); Sterenn Guerrier, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 17 days.

(21) Appl. No.: 17/150,916

(22) Filed: Jan. 15, 2021

(65) Prior Publication Data

US 2021/0231467 A1    Jul. 29, 2021

(30) Foreign Application Priority Data

Jan. 24, 2020   (EP) .................................... 20305062

(51) Int. Cl.
*G01D 5/353* (2006.01)
*G01H 9/00* (2006.01)

(52) U.S. Cl.
CPC ......... *G01D 5/35358* (2013.01); *G01H 9/004* (2013.01)

(58) Field of Classification Search
CPC ............. G01D 5/35358; G01H 9/004; G01M 11/3118; H04B 10/071; G01V 1/208
See application file for complete search history.

(56) References Cited

U.S. PATENT DOCUMENTS 5,011,262 A    4/1991  Layton
7,283,216 B1 *  10/2007  Geng ................. G01D 5/35303
                                                     356/477

(Continued)

FOREIGN PATENT DOCUMENTS

CN     101034035 A     9/2007
CN     102538945 A     7/2012

(Continued)

OTHER PUBLICATIONS

Extended European Search Report for corresponding European application No. 20305062.0; dated Jul. 24, 2020 (17 pages).

(Continued)

*Primary Examiner* — John Bedtelyon
(74) *Attorney, Agent, or Firm* — Mendelsohn Dunleavy, P.C.; Steve Mendelsohn

(57) ABSTRACT

An optical sensing system for detecting fiber events along an optical cable under test (CUT) having forward and feedback fibers and multiple pairs of optical couplers interconnected along the forward and feedback fibers in a ladder topology. An optical transmitter generates an optical probing signal for a forward fiber, wherein the couplers along the forward fiber provide tapped portions of the probing signal to the couplers along a feedback fiber to form a combined optical feedback signal in the feedback fiber. A reference coupler is connected between the transmitter and the forward fiber to tap an optical reference signal from the probing signal, and a feedback coupler is connected to combine the reference signal and the feedback signal. An optical receiver receives and processes the combined reference and feedback signals from the feedback coupler to detect fiber events along the CUT.

11 Claims, 3 Drawing Sheets

(56) References Cited

U.S. PATENT DOCUMENTS

| | | | |
|---|---|---|---|
| 10,113,935 | B2 | 10/2018 | Wang et al. |
| 2009/0027656 | A1 | 1/2009 | Zhang et al. |
| 2009/0111417 | A1 | 4/2009 | Waagaard et al. |
| 2014/0176937 | A1 | 6/2014 | Liu et al. |
| 2016/0003669 | A1 | 1/2016 | Lee et al. |
| 2017/0145819 | A1 | 5/2017 | Maida, Jr. et al. |
| 2017/0328809 | A1 | 11/2017 | Chen et al. |
| 2017/0356793 | A1 | 12/2017 | Nishiguchi et al. |

FOREIGN PATENT DOCUMENTS

| | | |
|---|---|---|
| EP | 2765400 A1 | 8/2014 |
| EP | 3460441 A1 | 3/2019 |
| EP | 3595195 A1 | 1/2020 |
| EP | 3694117 A1 | 8/2020 |
| EP | 3795960 A1 | 3/2021 |
| EP | 3896409 A1 | 10/2021 |
| WO | 2017137729 A1 | 8/2017 |

OTHER PUBLICATIONS

Awwad, Elie, et al. "Large Bandwidth Phase-Sensitive DAS with Novel Polarization-Multiplexed Probing Technique." Optical Fiber Sensors. Optical Society of America, Paper ThE63 (2018): 1-4.

Dorize, Christian, et al. "Enhancing the performance of coherent OTDR systems with polarization diversity complementary codes." Optics Express 26.10 (2018): 12878-12890.

Dorize, Christian, et al. "High Sensitivity φ-OTDR over Long Distance with Polarization Multiplexed Codes." www.arxiv.org, arXiv:1902.01875 (Feb. 5, 2019): 1-4.

Dorize, Christian, et al. "Vibration Identification Over 50km SSMF with Pol-Mux Coded Phase-OTDR." 45th European Conference on Optical Communication (ECOC 2019), Dublin, Ireland, Institution of Engineering and Technology (Sep. 22-26, 2019): 1-4.

Fan, Xinyu, et al. "Distributed Fiber-Optic Vibration Sensing Based on Phase Extraction from Optical Reflectometry." Journal of Lightwave Technology 35.16 (2017): 3281-3288.

Fu, Yun, et al. "Ultra-Long-Distance Hybrid BOTDA/Φ-OTDR." Sensors 18.4, Article 976 (2018): 1-8.

Guerrier, Sterenn, et al. "Introducing Coherent MIMO Sensing, a fading-resilient, polarization-independent approach to φ-OTDR." Optics Express 28.14 (2020): 21081-21094.

Hartog, A. H., et al. "The Use of Multi-frequency Acquisition to Significantly Improve the Quality of Fibre-optic Distributed Vibration Sensing." 78th EAGE Conference and Exhibition, Vienna, Austria. May 30-Jun. 2. Paper TuP408 (2016): 1-5.

Healey, P. "Fading in heterodyne OTDR." Electronics Letters 20.1 (1984): 30-32.

Lai, Macheng, et al. "Ultra-long Distance Distributed Intrusion Detecting System Assisted With In-line Amplification." IEEE Photonics Journal 9.2 Article 6801810 (2017): 1-10.

Marra, Giuseppe, et al. "Ultrastable laser interferometry for earthquake detection with terrestrial and submarine cables." Science 361.6401 (2018): 486-490.

Martins, H. F., et al. "Real time dynamic strain monitoring of optical links using the backreflection of live PSK data." Optics Express 24.19 (2016): 22303-22318.

Peng, Fei, et al. "Ultra-long high-sensitivity Φ-OTDR for high spatial resolution intrusion detection of pipelines." Optics Express 22.11 (2014): 13804-13810.

Ye, Zi, et al. "Ultra-long-distance (> 160 km) distributed optic fiber vibration sensing system without an in-line repeater." Applied Optics 58.13 (2019): 3426-3431.

Zabihi, Mohammadmasoud, et al. "Continuous Fading Suppression Method for Φ-OTDR Systems Using Optimum Tracking Over Multiple Probe Frequencies." Journal of Lightwave Technology 37.14 (2019): 3602-3610.

Zhang, Jingdong, et al. "Long range fading free phase-sensitive reflectometry based on multi-tone NLFM pulse." Proceeding of 26th International Conference on Optical Fiber Sensors, OSA, paper TuC3 (2018): 1-4.

Rohrs, U. H., et al. "Some unique properties and applications of perfect squares minimum phase CAZAC sequences." Proceedings of the 1992 South African Symposium on Communications and Signal Processing. Cape Town, South Africa, IEEE, (1992): 155-160.

Ma, Zhe, et al. "Double-sideband heterogeneous pulse modulation method for distributed acoustic sensing." 2017 International Conference on Optical Instruments and Technology: Advanced Optical Sensors and Applications. vol. 10618. SPIE, Abstract (2018) 1-3.

Dorize, Christian, et al. "Capturing Acoustic Speech Signals with Coherent MIMO Phase-OTDR." 2020 European Conference on Optical Communications (ECOC). Brussels, Belgium. IEEE, (Dec. 6-10, 2020): 1-4.

* cited by examiner

FIBER PHASE SENSING USING A LADDER TOPOLOGY

CROSS-REFERENCE TO RELATED APPLICATIONS

This application claims the benefit of the filing date of European patent application no. 20305062.0 under 35 U.S.C. 119, the teachings of which application are incorporated herein by reference in their entirety.

BACKGROUND

Field of the Invention

Various example embodiments relate to optical equipment such as optical communication equipment and, more particularly but not exclusively, to optical sensing along optical fibers using distributed acoustic/vibration sensing (DAS/DVS).

Description of the Related Art

This section introduces aspects that may help facilitate a better understanding of the invention. Accordingly, the statements of this section are to be read in this light and are not to be understood as admissions about what is prior art or what is not prior art.

Optical fibers are sensitive to surrounding mechanical perturbations which induce fiber length variations, potentially resulting in variations of phase, intensity, and polarization. Though these variations are considered as noise and are thus mitigated in optical transmission systems, they are used for sensing applications in specific configurations such that Optical Time Domain Reflectometry (OTDR), which exploits random and low-intensity Rayleigh backscattered light.

In a number of different applications, it is useful to be able to detect time-based mechanical and/or chemical changes along an optical fiber, referred to herein collectively as fiber events.

For example, in communications systems having fiber-optic communication links, it may be useful to detect the existence and location of fiber events in an optical fiber, such as those induced by a train passing nearby the optical fiber. This information may be used to monitor the quality of the optical link (e.g., a vibration may alter the transmission rate) or to monitor any fiber event independent of the telecom purpose (e.g., for security alerts).

Distributed acoustic/vibration sensing (DAS/DVS) allows for detection of mechanical and/or chemical perturbation at various locations along an optical fiber using Rayleigh backscattering. This effect can be exploited in standard single-mode fibers (SSMF) deployed in telecommunication systems. Randomly distributed Rayleigh backscattering spots exist in the fiber as imperfections during its fabrication process. By capturing the optical signal that is reflected from these spots, phase changes induced by fiber events impacting a deployed fiber can be detected.

Some work has described methods for capturing an estimate of a backpropagated optical field within an optical fiber. For example, an interrogator may yield Jones matrix estimates from the received backpropagated signal and process them to detect the emergence of a mechanical event. The system can include phase extraction and differential (spatial) phase derivation to detect and localize mechanical events that may occur along the fiber.

Standard OTDR fiber sensor systems use the intensity of Rayleigh backscattering to detect and localize static impairments (e.g., losses or cuts). With long distances, sensing is limited by signal-to-noise ratio (SNR) issues, where only a small fraction of the intensity signal is backscattered (around −70 dB/m) and, due to the attenuation in the optical fiber of about 0.2 dB/km, the maximum reach is limited. To overcome this issue in intensity sensing, the backscattered signal may be averaged over several minutes or hours so that it eventually allows the detection of a static impairment over ultralong distance such as for transoceanic lines.

It is desirable to be able to perform dynamic measurements over long distance from already deployed (or next generation) telecom cables to detect and localize geophysical phenomena as earthquakes or tsunamis, which may exhibit high energy vibration spread over a very low mechanical bandwidth (e.g., less than a few Hz). Such processing may involve a switch from standard intensity-based OTDR to coherent-detection-based φ-OTDR. With this latter technique, no averaging in time is possible to tackle power budget issues since it would prevent the detection of the low-frequency components and thus the signature of the geophysical events. On top of this, φ-OTDR typically relies on the use of an ultra-stable laser source, with a coherence length in line with the roundtrip distance of the fiber to sense. Therefore, detecting dynamic events over very long fiber distances from the sole Rayleigh backscattering turns out to be an overwhelming task.

Note that the forward transmission path also contains the mechanical perturbation information. In that case, the SNR is high since the signal experiences only the 0.2 dB/km fiber attenuation. However, the received signal after forward transmission does not typically allow for a distributed measurement over the fiber, as is the case with Rayleigh backscattered information, where the overall fiber response may be concentrated into a single symbol period and enclose the overall phase variations met along the fiber path (from the laser phase drift to the contributions of environmental disturbances) so that the localization information of disturbances is lost.

Current commercial systems for transoceanic cables may include static intensity OTDR, on which an average of measurements can reveal the presence and location of failures on the line. These modules may not support dynamic sensing.

Some work has suggested using laser interferometry for earthquakes detection and localization over existing submarine and terrestrial telecommunications cables, in which the optical fiber is looped back at the remote end and the signal is returned on a second fiber. The phase stability of the optical source may be obtained with a metrology-grade laser that maintains the light coherence over several thousand kilometers. This setup seems to be different from the widely used reflectometry scheme and to allow for an overall measurement of the integral of the dynamic strain on the line, that is without spatial information to enable event localization. According to that paper, an earthquake epicenter may be approximately localized by triangulation techniques from the information detected from several independent lines. Therefore, localization performances are subject to the presence, the number, and the position of independent optical cables, assumed to be all equipped with such a forward-sensing system.

The market availability of ultra-low phase noise laser sources compatible with transoceanic distance is also an issue. In addition, laser sources show a higher phase noise level at low frequencies (1/f envelope below at least 1 kHz)

and this low-frequency noise has a stronger impact when sensing long-distance fibers because the interrogation signal spreads over a longer time period.

For standard backscattering-based sensing, the system may need either a special fiber coating or specific amplification somewhere on the fiber line, and sometimes may use secondary techniques such as Raman amplification that could disturb the co-propagating signals in cases where the line under test is not a dedicated fiber (but, say, just a dedicated wavelength).

SUMMARY

C. Dorize and E. Awwad, "Enhancing the performance of coherent OTDR systems with polarization diversity complementary codes," Optics Express, 26(10), pp. 12878-12890, 2018 ("the Dorize/Awwad paper"), and E. Awwad, C. Dorize, P. Brindel, J. Renaudier and G. Charlet, "Large Bandwidth Phase-Sensitive DAS with Novel Polarization-Multiplexed Probing Technique," Optical Fiber Sensors (OFS26) conference, Lausanne, Switzerland, paper ThE63, 2018, the teachings of both of which are incorporated herein by reference in its entirety, describe a method for periodically capturing an estimate (high sensitivity and large bandwidth) of the backpropagated optical field in a fiber. The method may yield Jones matrix estimates as a function of distance and time from which the differential (over distance) phase (at each location over the distance axis as a function of time) may be processed to detect the emergence of fiber events.

According to certain embodiments, a multi-fiber optical cable includes multiple cable spans interconnected by repeaters to perform optical amplification. Near some or all of the repeaters, a fraction of the forward-propagating light in one of the so-called forward fibers is looped back to a nearby point on the feedback fiber, typically by a local pair of interconnected optical couplers, e.g., the pair of couplers may both be near or at the same one of the repeaters. The forward propagating light may be transmitted from a laser source having coherence properties that match the roundtrip path length of the overall cable. The laser source may typically be modulated with polarization-multiplexed signals. The feedback fiber is connected to a coherent mixer in a homodyne configuration (where the local oscillator is the laser source also used for transmitting light to the forward fiber). The output from a Mach-Zehnder modulator is connected to the feedback fiber right before entering the coherent mixer (as a reference feedback loop), typically with couplers in the same way as mentioned above for the repeater outputs.

In some embodiments, an interrogation technique, e.g., as defined in EP application publication EP3460441A1, which is incorporated by reference herein in its entirety, may provide, beyond the intensity response, a Jones matrix estimate for some or all of the return paths. The cumulated optical phase may be extracted from the Jones matrix at some or all of the intensity peak locations. The optical phase terms may, e.g., then be differentiated to capture a local phase estimation per span. The interrogation and associated processing may also be applied periodically to capture time evolution of the local optical phase per span.

Such a technique may provide a twofold advantage: (1) a mitigation of the low phase noise variations of the transmitter (laser source), due to the reference feedback path information, and (2) a localization of fiber events along the fiber, e.g., with a spatial resolution equal to the span length. In some embodiments, this level of localization may be sufficient for ultra-low mechanical frequency signatures from some types of geophysical events.

According to an example embodiment disclosed below in reference to FIGS. 1-4, provided is an apparatus (e.g., 100, FIG. 1) for detecting fiber events along an optical cable under test (i.e., herein referred to as CUT) (170) comprising at least one forward fiber (150), at least one feedback fiber (160), and multiple pairs of optical couplers (152, 162). The couplers of each pair interconnect physically nearby parts of the forward and feedback fibers (150, 160) so that a ladder-like topology, i.e., formed by the interconnected pairs of couplers and the forward and feedback fibers (150, 160) themselves. The apparatus comprises an optical transmitter (110), a reference coupler (130), a feedback coupler (140), and an optical receiver (120). The optical transmitter (110) is configured to transmit an optical probing signal (119) to the forward fiber (150). Each of the couplers (152) along the forward fiber (150) provides a locally tapped portion (153) of the probing signal (119) to a corresponding and nearby paired coupler (162) along the feedback fiber (160). The set of pairs of optical couplers (152, 162) form a combined optical feedback signal (161) in the feedback fiber (160). The reference coupler (130) is connected between the transmitter (110) and the forward fiber (150) to tap an optical reference signal (131) from the probing signal (119). The feedback coupler (140) is connected to combine the reference signal (131) and the feedback signal (161). The optical receiver (120) configured to receive and process the combined reference and feedback signals (131+161) from the feedback coupler (140) to detect fiber events along the CUT (170).

In some embodiments of the above apparatus, the apparatus further comprises the CUT.

In some embodiments of any of the above apparatuses, the CUT further comprises one or more optical amplifiers along the forward fiber.

In some embodiments of any of the above apparatuses, the CUT further comprises one or more optical amplifiers along the feedback fiber.

In some embodiments of any of the above apparatuses, the CUT comprises two or more forward fibers (150), each having optical couplers (151), wherein the transmitter (110) is configured to generate different optical probing signals (119) for the different forward fibers (150) and the receiver (120) is configured to receive and process different combined reference and feedback signals (131+161) for the different forward fibers (150).

In some embodiments of any of the above apparatuses, the probing signal is an optical pulse.

In some embodiments of any of the above apparatuses, the probing signal is a binary-coded optical signal.

In some embodiments of any of the above apparatuses, the probing signal is a dual-polarization digital sweep signal.

In some embodiments of any of the above apparatuses, the optical transmitter (110) comprises a laser source (112) configured to transmit a laser signal (113); an optical coupler (114) configured to tap off a tapped portion (115a) of the laser signal for forwarding to the optical receiver (120); and a modulator (116) and optionally an amplifier (118) configured to modulate and to optionally amplify another portion (115b) of the laser signal (113) using one or more digital coding sequences (111) to generate the probing signal (119). The optical receiver (120) comprises an optical mixer (122) configured to mix the tapped portion (115a) of the laser signal with the reference and feedback signals (131+161) to generate component optical signals (123); optical-to-electrical converters (124) and analog-to-digital converters (126)

configured to generate digital electrical signals (127) from the component optical signals (123); and a digital signal processor DSP (128) configured to process the digital electrical signals (127) to detect the fiber events along the CUT.

According to another example embodiment disclosed below in reference to FIGS. 1-4, provided is a method comprising providing an apparatus (100) that detects fiber events along an optical cable under test CUT (170) comprising at least one forward fiber (150), at least one feedback fiber (160), and multiple pairs of optical couplers (152, 162) interconnected along the forward and feedback fibers (150, 160) in a ladder topology. The apparatus comprises an optical transmitter (110), a reference coupler (130), a feedback coupler (140), and an optical receiver (120). The optical transmitter (110) transmits an optical probing signal (119) to the forward fiber (150), wherein the couplers (152) along the forward fiber (150) provide tapped portions (153) of the probing signal (119) to the corresponding paired couplers (162) along the feedback fiber (160) to form a combined optical feedback signal (161) in the feedback fiber (160). The reference coupler (130) is connected between the transmitter (110) and the forward fiber (150) to tap an optical reference signal (131) from the probing signal (119). The feedback coupler (140) is connected to combine the reference signal (131) and the feedback signal (161). The optical receiver (120) receives and processes the combined reference and feedback signals (131+161) from the feedback coupler (140) to detect fiber events along the CUT (170).

In some embodiments of the above method, the probing signal is a binary-coded optical signal.

In some embodiments of any of the above methods, the optical transmitter (110) comprises a laser source (112) that generates a laser signal (113); an optical coupler (114) that taps off a tapped portion (115a) of the laser signal for forwarding to the optical receiver (120); and a modulator (116) and an optional amplifier (118) that modulate and optionally amplify another portion (115b) of the laser signal (113) using one or more digital coding sequences (111) to generate the probing signal (119). The optical receiver (120) comprises an optical mixer (122) that mixes the tapped portion (115a) of the laser signal with the reference and feedback signals (131+161) to generate component optical signals (123); optical-to-electrical converters (124) and analog-to-digital converters (126) that generate digital electrical signals (127) from the component optical signals (123); and a digital signal processor DSP (128) that processes the digital electrical signals (127) to detect the fiber events along the CUT.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

At least some embodiments disclosed herein may benefit from the use of at least some features disclosed in the Dorize/Awwad paper. In particular, some embodiments may benefit from the use of the DAS/DVS technique(s) disclosed therein. An example DAS/DVS technique described herein enables detection of fiber events along a multi-fiber optical cable using distributed acoustic/vibration sensing based on optical phase sensing of tapped optical signals that are analyzed to detect temporal changes in the characteristics of different locations along the cable.

Figure 1:
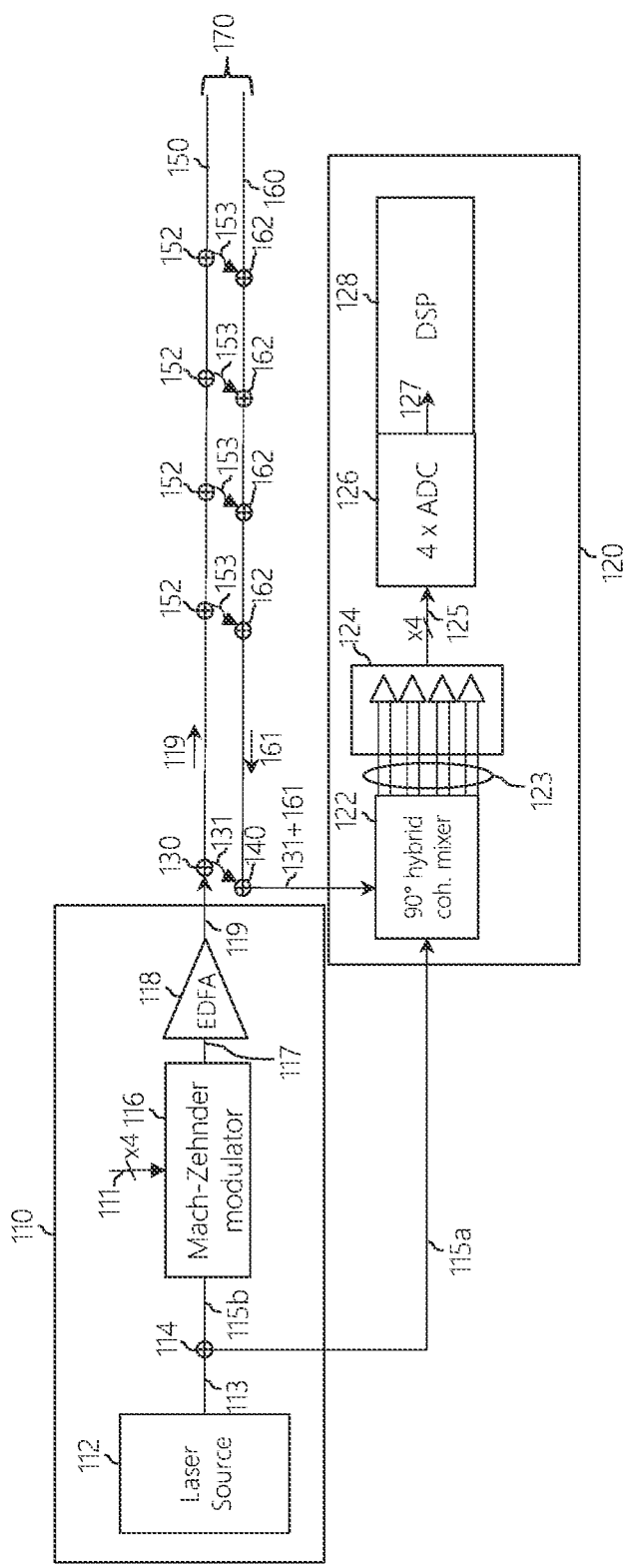
FIG. 1 is a block diagram of an optical sensing system that is designed and configured to detect and determine the locations of fiber events along the length of an optical fiber.

FIG. 1 is a block diagram of an optical sensing system 100 that is designed and configured to detect and determine the approximate locations of fiber events along the length of a multi-fiber optical cable under test (CUT) 170. The CUT comprises, at least, one forward fiber 150 and, at least, one feedback fiber 160.

As shown in FIG. 1, the forward fiber 150 has a number of optical couplers 152 distributed along its length, and the feedback fiber 160 has a corresponding number of optical couplers 162 distributed along its length, where each coupler 152 taps an optical signal 119 traveling along the forward fiber 150 in the forward direction (i.e., left to right in FIG. 1) and provides that tapped portion 153 to the corresponding coupler 162 of the feedback fiber 160 to form a combined optical feedback signal 161 travelling along the feedback fiber 160 in the feedback direction (i.e., the backwards direction of right to left in FIG. 1). This configuration of forward and feedback fibers 150 and 160 with interconnected nearby pairs of optical couplers 152 and 162 is referred to as having a ladder topology.

Although not explicitly shown in FIG. 1, in some implementations, the forward fiber 150 has one or more optional optical amplifiers (e.g., EDFAs) distributed along its length that amplify the probing signal 119 and/or the feedback fiber 160 has one or more optional optical amplifiers distributed along its length that amplify the feedback signal 161. Depending on the particular implementation, those optical amplifiers might or might not be co-located with the optical couplers 152, 162.

In some implementations, the feedback fiber 160 in FIG. 1 is a single, dedicated fiber in a multi-fiber cable, where that dedicated fiber can be used in a time-division and/or wavelength-division manner as the feedback fiber 160 for two or more other fibers in the cable functioning as instances of the forward fiber 150 of FIG. 1 to detect fiber events along the cable. In other implementations, any fiber in a multi-fiber cable can be used as the feedback fiber 160 for any other fiber in the cable functioning as the forward fiber 150 to detect fiber events along the cable. As described previously, the term "fiber event" is used to refer to a mechanical and/or chemical change at a location along the length of a cable that results in a significant change in the phase of the tapped portions 153 returned by one or more couplers 152 located downstream of the fiber event, e.g., a mechanical event might be receipt of vibrations due to a seismic wave and/or a water wave.

System 100 comprises an optical transmitter 110 that generates and transmits a suitable optical probing signal 119, an optical receiver 120, and two optical couplers: a reference coupler 130 and a feedback coupler 140. The reference coupler 130 taps off part of the probing signal 119 and provides a tapped reference signal 131 to the feedback coupler 140, which combines the reference signal 131 with the feedback signal 161 received from the feedback fiber 160 and provides the combined reference and feedback signals 131+161 to the receiver 120. In certain implementations, the transmitter 110, the receiver 120, and the couplers 130 and 140 are mounted inside a mechanically and electromagnetically insulated environment.

As used herein, the term "upstream" refers to locations along the cable 170 that are closer to the transmitter 110, while the term "downstream" refers to locations along the cable 170 that are farther from the transmitter 110.

In particular implementations of FIG. 1, the optical transmitter 110 comprises a laser source 112, e.g., of high coherence, a polarization-maintaining (PM) optical coupler 114, a Mach-Zehnder (MZ) optical modulator 116 (or other suitable optical amplifier), and an erbium-doped fiber amplifier (EDFA) (or other suitable optical amplifier) 118. The PM coupler 114 taps off a portion 115a of the polarized laser source signal 113 generated by the laser source 112 and forwards that portion 115a to the optical receiver 120. The MZ modulator 116 modulates the remainder 115b of the laser signal 113, e.g., based on four digital-coded analog signals 111, to generate a modulated optical signal 117 that is amplified by the EDFA 118 to generate the outgoing modulated optical probing signal 119. In one possible implementation, four digital-coded analog signals 111 are based on complementary binary phase shift-keying (BPSK) in-phase I and quadrature Q codes that get modulated onto the horizontal (X) and vertical (Y) polarization components of the polarized laser signal 115b. Note that, in polarization-division-multiplexed (PDM) BPSK, the Q codes are optional. Those skilled in the art will understand that other coding schemes may be employed, including (without limitation) PDM quadrature-phase shift keying (QPSK) and the dual-polarization digital sweep probing technique described in EP application no. 19306137.1, the teachings of which are incorporated herein by reference in their entirety.

The transmitter 110 injects the probing signal 119 into the forward fiber 150 via the (PM) reference coupler 130, where the probing signal 119 gets tapped by each coupler 152 along the forward fiber 150 and the resulting tapped signal 153 is transferred to the corresponding coupler 162 of the feedback fiber 160 and back towards the optical receiver 120 as part of the combined feedback signal 161 on the feedback fiber 160. The feedback signal 161 received by the (PM) feedback coupler 140 from the feedback fiber 160 is the superposition of all of the different tapped signals 153 from the different couplers 152 shifted in time (and having differential phase) relative to one another based on the round-trip transmission times from the reference coupler 130 along the forward fiber 150 to the coupler pairs 152, 162 and then back to the feedback coupler 140 along the feedback fiber 160. The combined reference and feedback signals 131+161 are forwarded by the feedback coupler 140 to the optical receiver 120, which processes those combined signals 131+161 to characterize the various tapped signals 153 from the coupler pairs 152, 162 at specified locations along the CUT 170 relative to the reference signal 131, where the location d of each coupler pair 152, 162 is associated with and can be identified by a unique round-trip transmission time based on the combined distance along the forward and feedback fibers 150 and 160.

The OTDR optical receiver 120 of FIG. 1 may typically be a dual-polarization coherent receiver that comprises a 90-degree hybrid coherent mixer 122 (in a substantially homodyne configuration in which the local oscillator is the laser source 112 used to charge the CUT 170. But, the interfered light may have a relative time delay with respect to the local oscillator light due to the roundtrip propagation in the CUT), four optical-to-electrical (O-to-E) converters 124, four analog-to-digital converters (ADCs) 126, and a digital signal processor (DSP) 128.

The mixer 122, which comprises, e.g., two single-polarization 90-degree hybrids (not shown), mixes the combined reference and feedback signals 131+161 received from the feedback coupler 140 with the tapped polarized laser signal 115a received from the coupler 114 to generate four different pairs of optical components 123 for sensing respective in-phase and quadrature beating signals between the horizontal and vertical polarization components of the polarized laser signal 115a and the horizontal and vertical polarization components of the combined signals 131+161 or linearly independent combinations of said four components. The O-to-E converters 124 convert those eight optical components 123 into four analog electrical signals 125 that get digitized by the four ADCs 126 into digital signals 127 that are processed by the DSP 128. In one implementation, the O-to-E converters 124 comprise (i) four balanced photodetector pairs (not explicitly shown) configured to convert the four pairs of optical components 123 into four analog electrical signals, via differential sensing, and (ii) four trans-impedance amplifiers (TIAs) configured to amplify the four analog electrical signals to generate the four analog electrical signals 125 that are digitized by the four ADCs 126.

The DSP 128 determines the channel response of the CUT 170 by measuring correlations between the digital signals 127 and the digital code sequences used to generate the digital-coded analog signals 111 and then generates some or all of the Jones matrix elements for different locations along the CUT 170 using corresponding data points of the channel response. Assuming that the CUT 170 has been probed jointly on both polarization axes by means of complementary digital code sequences, the DSP 128 is configured to generate 2×2 Jones matrices J(d,t) at time index t and distance index d from the four digital signals 127, e.g., using some of the procedures disclosed in the Dorize/Awwad paper.

The DSP 128 derives, from determined elements of the Jones matrices, differential phase data φ(d,t) as a function of time t for different locations d along the CUT 170, where each location is identified by a distance index value d representative of the round-trip transmission time for that location. The DSP 128 (or some other processing module downstream of the DSP 128) analyzes the differential phase data to identify fiber events. For example, if the DSP 128 detects a sinusoidal oscillation over time in the differential phase data for a particular location, then the DSP 128 can determine that a vibration in the CUT 170 occurred at or near that location. If, on the other hand, the DSP 128 detects a step function over time in the differential phase data for a particular location, then the DSP 128 can determine that a chemical change in the CUT 170 occurred at or near that location.

The transmission of the probing signal 119 can be periodically repeated, as long as feedback signals 161 corresponding to different transmissions of the digital codes do not overlap. One way to prevent such overlap is to ensure that the employed digital codes are at least as long as the maximum round-trip transmission time from the reference coupler 130 to the last coupler pair 152, 162 and back to the feedback coupler 140. In that case, the probing signal 119 can be transmitted continuously.

Figure 2:
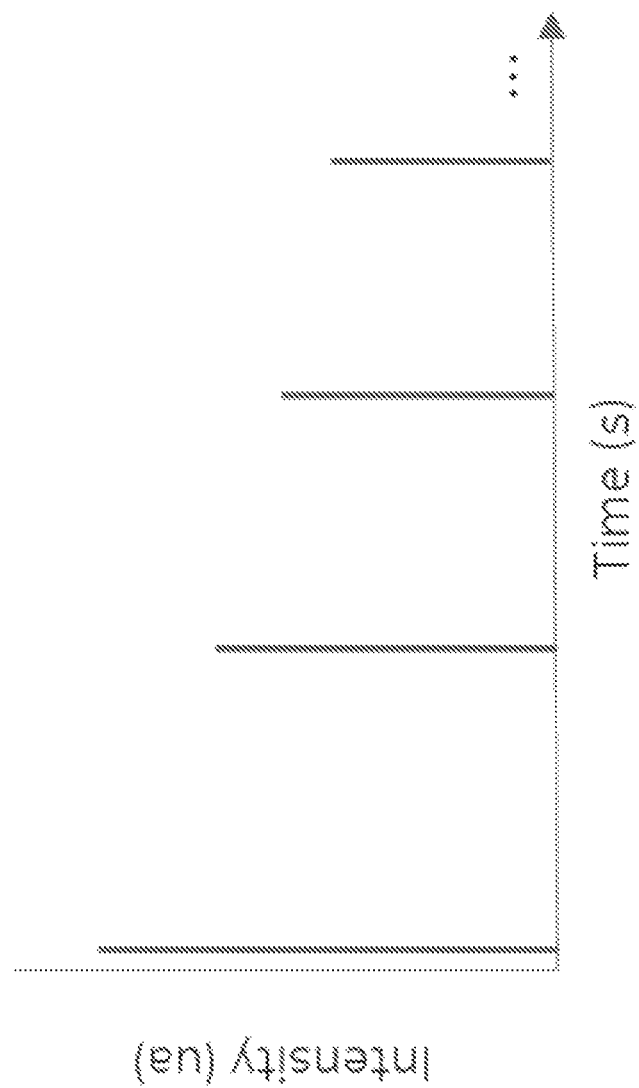
FIG. 2 is a graphical representation of the combined reference and feedback signals of FIG. 1.

FIG. 2 is a graphical representation of the intensity of the combined reference and feedback signals 131+161 of FIG. 1 as a function of time. The left-most (i.e., initial) intensity peak represents the contribution of the reference signal 131, while the subsequent intensity peaks correspond to the signals 153 tapped at the successive couplers 152, where intensity decreases with increased time (i.e., increased loopback distance). Such intensity decreases could apply to an implementation that does not have any optical amplifiers along the feedback fiber 160, whether or not there are optical amplifiers along the forward fiber 150. If there are optical amplifiers along both the forward and feedback fibers 150 and 160, then the intensities of the subsequent peaks could be substantially equal, although possibly less than the initial peak corresponding to the reference signal 131.

The system 100 may use an interrogation technique as defined in the '997 EP application and the Dorize/Awwad paper to generate a Jones matrix estimate for the intensity peak corresponding to each of the span loops, where the path from the reference coupler 130 to each coupler 152 along the forward fiber 150 and back to the feedback coupler 140 along the feedback fiber 160 from the corresponding coupler 162 corresponds to a different span loop. Note that the path from the reference coupler 130 directly to the feedback coupler 140 functions as a reference span loop for the other span loops. For each span loop, the cumulative optical phase is extracted from one or more elements of the Jones matrix. The optical phase terms are then differentiated between consecutive span loops to capture a local phase estimation for each span loop. The interrogation and associated processing are applied periodically to characterize a time evolution of the local optical phase per span loop. Fiber events are then detected by analyzing the time evolutions for the different span loops. By using the laser source 112 as the local oscillator for charging the CUT 170, the system 100 is able to detect fiber events with a spatial resolution equal to the distance between consecutive coupler pairs 152, 162, while mitigating low phase noise variations of the laser source 112.

In certain implementations, the polarized laser signal 115b has a sufficiently long coherence time. In particular embodiments, the laser source 112 that drives the transmitter 110 and the receiver 120 has a coherence time greater than the maximum propagation time of the probing signal 119 on the CUT 170 from the transmitter 110 to the receiver 120.

In one example embodiment, the optical sensing system 100 monitors the CUT 170 to monitor ground comprising oil and gas resources. The symbol frequency is determined as $f_{symb}$=100 MHz, with span length $d_s$=10m and the CUT length=1 km. The coherence time of the laser source 112 is then on the magnitude of $10^{-5}$s corresponding to a spectral line width of 100 kHz.

Two pairs of Golay sequences can be used to generate the X- and Y-axis modulation codes for the modulated optical probing signal 119 of FIG. 1. In general, a Golay sequence G(n) contains a sequence of values, where each value is either +1 or −1. Two Golay sequences $G_a(n)$ and $G_b(n)$ are said to be complementary if they exhibit the following property:

$$G_a(n) \otimes G_a(n) + G_b(n) \otimes G_b(n) = \delta(n) \quad (1)$$

where n is for a given symbol, $\otimes$ is the correlation operator, and $\delta$ is the Dirac delta function (scale factor omitted here). The correlation between two signals x(n) and y(n) can be defined relative to the convolution operator as follows: $x(n) \otimes y_i$, where y(n)* denotes the complex conjugate of y(n).

Two different pairs of complementary Golay sequences can be used to generate the digital-coded analog signals 111 used to generate the probing signal 119. According to one possible coding scheme, a first pair of complementary sequences $G_{1a}$, $G_{1b}$ is defined as:

$$G_{1a}(n) \otimes G_{1a}(n) + G_{1b}(n) \otimes G_{1b}(n) = \delta(n) \quad (2)$$

A second pair of complementary sequences $G_{2a}$, $G_{2b}$ is generated to be mutually orthogonal with the first pair, such that:

$$G_{2a}(n) \otimes G_{2a}(n) + G_{2b}(n) \otimes G_{2b}(n) = \delta(n) \quad (3)$$

$$G_{1a}(n) \otimes G_{2a}(n) + G_{1b}(n) \otimes G_{2b}(n) = 0 \quad (4)$$

$$G_{a1}(n) \otimes G_{b1}(n) + G_{a2}(n) \otimes G_{b2}(n) = 0 \quad (5)$$

The following represents four Golay sequences having length $N_G$=4:

$$G_{1a}^4 = [1,-1,-1,-1] \quad (6)$$

$$G_{1b}^4 = [-1,1,-1,-1] \quad (7)$$

$$G_{2a}^4 = [-1,-1,1,-1] \quad (8)$$

$$G_{1a}^4 = [1,1,1,-1] \quad (9)$$

Longer Golay sequences can be generated using the following recursive relationships:

$$G_{1a}^{2Ng} = [G_{1a}^{Ng}, G_{1b}^{Ng}] \quad (10)$$

$$G_{1b}^{2Ng} = [G_{1a}^{Ng}, -G_{1b}^{Ng}] \quad (11)$$

$$G_{2a}^{2Ng} = [G_{2a}^{Ng}, G_{2b}^{Ng}] \quad (12)$$

$$G_{2b}^{2Ng} = [G_{2a}^{Ng}, -G_{2b}^{Ng}] \quad (13)$$

Those skilled in the art will understand that different combinations of the Golay sequences $G_{1a}$, $G_{1b}$, $G_{2a}$, and $G_{2b}$ can be used to generate symbols for the X- and Y-axis codes. For example, as indicated above, if the Golay sequences $G_{1a}$ and $G_{1b}$ are used to generate the symbols for the X-axis code, then the Golay sequences $G_{2a}$ and $G_{2b}$ are used to generate the symbols for the Y-axis code.

In one possible implementation of the coding scheme described above, the Golay sequences of Equations (6)-(9) are used and each symbol is a BPSK symbol. In that case, the X-axis code has two BPSK symbols, where each BPSK symbol encodes one value from the corresponding Golay sequence. Thus, for the X-axis code, the first BPSK symbol encodes the Golay sequence $G_{1a}^4 = [1,-1,1,-1,1,-1,1]$, and the second BPSK symbol encodes the Golay sequence $G_{1b}^4 = [-1,1,-1,-1]$. For the Y-axis code, the first BPSK symbol encodes the Golay sequence $G_{2a}^4 = [1,1,1,-1]$, and the second BPSK symbol encodes the Golay sequence $G_{2b}{}^4=[1,1,1,-1]$. Other possible sets of X- and Y-axis codes may be generated in similar fashion based on other combinations of the Golay sequences of Equations (6)-(9).

The following description applies to processing associated with the probing signal 119 for the coding scheme described above, where each symbol is a BPSK symbol.

The two complementary and orthogonal pairs of Golay sequences $G_{1a}$, $G_{1b}$ and $G_{2a}$, $G_{2b}$ are transmitted simultaneously. BPSK modulation is used to code the pairs of sequences. Using complementary and orthogonal pairs of sequences enables the sending of the sequences to be factorized. On the X polarization axis, the two sequences $G_{1a}$, $G_{1b}$ of the first complementary pair are successively mapped onto BPSK symbols. At the same time, on the Y polarization axis, the two sequences $G_{2a}$, $G_{2b}$ of the second complementary pair are successively mapped onto BPSK symbols. The BPSK symbols from the two polarizations axes are transmitted simultaneously: the BPSK symbols carrying $G_{1a}$ on the X polarization axis are sent at the same time as the BPSK symbols carrying $G_{2a}$ on the Y polarization axis, and then the BPSK symbols carrying $G_{1b}$ on the X polarization axis are sent at the same time as the BPSK symbols carrying $G_{2b}$ on the Y polarization axis.

In an example, the factorization of the parts of the pairs for the X and Y polarizations are as follows:

$$E_{tx}(n+kP)=G_x(n) \qquad (14)$$

$$E_{ty}(n+kP)=G_y(n) \qquad (15)$$

where $E_{tx}$ is the component from the X polarization of the probing signal 119, $E_{ty}$ is the component from the Y polarization of the probing signal 119, P is the repetition period, k is the k-th repetition of period P, $G_x$ and $G_y$ being respective complementary Golay sequences.

In an example where BPSK is used:

$$G_x(n) = \begin{cases} G_{1a}(n); & 0 \le n < N_G \\ 0; & N_G \le n < N_G + N_{Sep} \\ G_{1b}(n - N_G - N_{Sep}); & N_G + N_{Sep} \le n < 2N_G + N_{Sep} \\ 0; & 2N_G + N_{Sep} \le n < L \end{cases} \qquad (16)$$

$$G_y(n) = \begin{cases} G_{2a}(n); & 0 \le n < N_G \\ 0; & N_G \le n < N_G + N_{Sep} \\ G_{2b}(n - N_G - N_{Sep}); & N_G + N_{Sep} \le n < 2N_G + N_{Sep} \\ 0; & 2N_G + N_{Sep} \le n < L \end{cases} \qquad (17)$$

where NG is the length of a sequence from the pair, $N_{sep}$ is an optional separation interval, and $L=2(N_G+N_{sep})$ is the overall transmitted code length.

The sequence $G_{1a}$ is transmitted first on the X polarization together with the sequence $G_{2a}$ on the Y polarization, then the sequence $G_{1b}$ is transmitted on the X polarization together with the sequence $G_{2b}$ on the Y polarization. To clarify, for the X polarization channel, the sequence $G_{1a}$ is transmitted, followed by the sequence $G_{1b}$. Simultaneously, for the Y polarization channel (orthogonal to X), the sequence $G_{2a}$ is transmitted, followed by the sequence $G_{2b}$. Note that, if $N_{sep}$ is set to zero, then the sequence $G_{1b}$ is transmitted immediately after the sequence $G_{1a}$ on the X polarization and the sequence $G_{2b}$ is transmitted immediately after the sequence $G_{2a}$ on the Y polarization.

At the receiver 120, the combined reference and feedback signals 131+161 comprise the following components:

$$E_{rx}(n)=h_{xx}(n)*G_x(n)+h_{xy}(n)*G_y(n) \qquad (18)$$

$$E_{ry}(n)=h_{yx}(n)*G_x(n)+h_{yy}(n)*G_y(n) \qquad (19)$$

where $E_{rx}$ is the X polarization component, $E_{ry}$ is the Y polarization component, $h_{xx}$ is the channel response of the CUT 170 for the X polarization, $h_{yy}$ is the channel response of the CUT 170 for the Y polarization, $h_{xy}$ is the channel response after modulation onto the Y polarization and measured onto the X polarization at the receiver 120, and $h_{yx}$ is the channel response after modulation onto the X polarization and measured onto the Y polarization at the receiver 120.

The polarization-dependent channel responses as observed at the receiver 120 can then be expressed as:

$$h'_{xx}(n)=E_{rx}(n)\otimes G_x(n) \qquad (20)$$

$$h'_{xy}(n)=E_{rx}(n)\otimes G_y(n) \qquad (21)$$

$$h'_{yx}(n)=E_{ry}(n)\otimes G_x(n) \qquad (22)$$

$$h'_{yy}(n)=E_{ry}(n)\otimes G_y(n) \qquad (23)$$

where the Jones matrices J are defined as:

$$J = \begin{bmatrix} h'_{xx}(n) & h'_{yy}(n) \\ h'_{yx}(n) & h'_{yy}(n) \end{bmatrix} \qquad (24)$$

In an embodiment, the probing sequence duration is determined according to $N_G$, $N_{sep}$, and the duration of a symbol $T_{symb}$. In an example, a perfect estimation with only null samples around the Dirac response is achievable if the CUT 170 has an impulse response with a duration $T_{ir}$ that spreads over a time less than $(N_G/2+N_{sep})T_{symb}$. In another example, the sequence length $N_G$ and the separation interval $N_{sep}$ are determined such that $N_G>2(T_{ir}/T_{symb}-N_{sep})$.

In an embodiment, the symbol rate of the optical signal is determined according to the distance between consecutive couplers 152, in order to increase the number of null samples of the inter-correlations of the components $G_x$, $G_y$. In an example, the symbol rate is determined as follows:

$$f_{symb} = \frac{4p}{\frac{2n_g d_s}{c}} \qquad (25)$$

where $f_{symb}$ is the symbol rate, $n_g$ is the fiber group index, c is the light velocity, $d_s$ is the average inter-distance between consecutive couplers 152, and p is an integer. In an example, with 1 km of inter-distance $d_s$ between consecutive couplers 152, $f_{symb}$ is a multiple of 400 kHz.

In an embodiment, the transmission of the pairs of sequences $G_{1a}$, $G_{1b}$ and $G_{1a}$, $G_{2b}$ is repeated. Such repetitions are advantageous as the CUT 170 and the couplers 152 are sounded continuously, thereby enabling monitoring fiber events within the CUT 170 with a fine time granularity, which depends on the symbol frequency and on the overall length of the CUT 170. The sounding duration of the CUT 170 is performed then during at least one duty cycle. For PDM-BPSK codes, the sounding duration should be spread over at least four duty cycles. For dual-polarization digital sweep signals, the sounding duration should be spread over at least two duty cycles.

Figure 3:
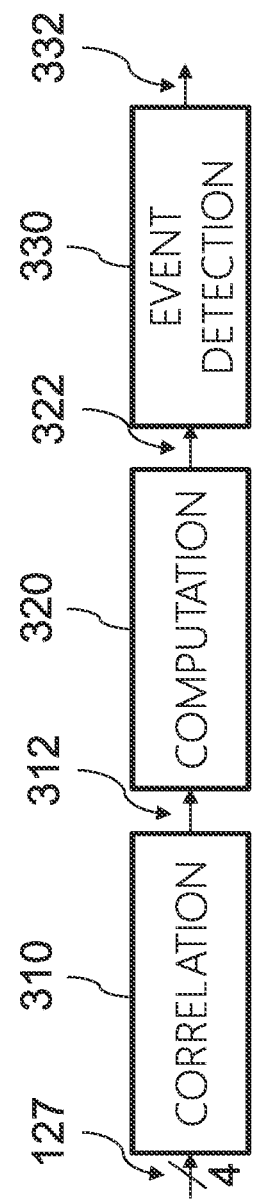
FIG. 3 is a block diagram of the processing performed by the DSP of FIG. 1 to detect fiber events in the optical cable according to an embodiment.

FIG. 3 is a block diagram of the processing performed by the DSP 128 of FIG. 1 to detect fiber events 332 in the CUT 170 according to an embodiment. A correlation module 310 performs correlation processing between the four digital signals 127 received from the four ADCs 126 of FIG. 1 and the four corresponding digital code sequences 111 used to generate the probing signal 119 in order to extract a space-time map 312 of the Jones matrices J(d,t). The correlation processing consists of four correlations to estimate the four coefficients of the 2×2 Jones matrices describing the temporal evolution of intensity, differential phase, and SOP along the CUT 170 segment by segment. For the BPSK coding scheme described previously, example correlations are presented in Equations (20)-(23).

The spatial resolution (i.e., the size of the fiber segments over which the Jones matrices are computed) is fixed by the baud rate, and the temporal resolution is given by the length of the probing code. The estimates of the Jones matrices are refreshed with a temporal resolution given by the period $T_{code}$ of the probing sequence assuming that the CUT 170 is probed by a repetition of this sequence. Note that $T_{code}$ fixes the maximum bandwidth BW of the fiber events that can be monitored: $BW=1/(2T_{code})$.

A computation module 320 processes the Jones matrices 312 to generate fiber data 322. In an embodiment, the fiber data 322 includes differential phase data φ(d,t), optical intensity data I(d,t), and state of polarization data SOP(d,t) for different locations d along the CUT 170 and at times t.

The DSP 128 derives absolute phase values $\psi_{t,d}$ from the Jones matrices J by calculating $\psi_{t,d}=(\frac{1}{2})\arg(\det(J))$, where det stands for the determinant of matrix J and arg stands for the angle, expressed in radians, of the complex value det(J). The absolute phase value $\psi_{t,d}$ for a location d represents the offset at time t between the probing signal 119 tapped at that location by a coupler 152 and received at the optical receiver 120. The DSP 128 generates differential (over distance) phase values $\varphi_{t,d}$ by calculating $\varphi_{t,d}=(\psi_{t,d}-\psi_{t,d-1})$, where each differential phase value $\varphi_{t,d}$ represents the difference between the absolute phase value $\psi_{t,d}$ for the location d and the absolute phase value $\psi_{t,d-1}$ for the previous location d−1. As used herein, the term "previous location" refers to the location of the coupler 152 that is immediately upstream from the location d. The absolute phase value $\psi_{t,d}$ for the reference span loop is used as a reference to extract the differential phases $\psi_{t,d}$ of the downstream locations.

The DSP 128 generates the intensity data I(d,t) as Trace (J.J*) for each selected location d and time t, where Trace refers to the sum of the elements on the diagonal of a matrix, J* stands for the conjugate transpose of the 2×2 Jones matrix J, and (J.J*) represents the matrix product of the two matrices.

In an embodiment, the DSP 128 generates the SOP data SOP(d,t) from the Jones matrices using a suitable technique such as those based on the conventional Stokes or Muller mathematical transformation.

In an event detection stage 330, the DSP 128 (or, in some alternative implementations, a processor external to the DSP 128) monitors the differential phase data 322 over multiple transmissions of the probing signal 119 to detect fiber events 332. When a fiber event eventually occurs at some location along the CUT 170, the DSP 128 can detect that fiber event based on the temporal changes in the differential phase data 322 for the coupler 152 located immediately downstream of the fiber event (referred to as the "detected location"). If the differential phase data 322 at a detected location indicates the existence of a fiber event, then the DSP 128 can conclude that the fiber event has occurred at or immediately upstream of that detected location.

For example, for two consecutive couplers 152(i) and 152(i+1), where the coupler 152(i) is upstream from the coupler 152(i+1), if the DSP 128 detects the existence of a fiber event 332 in the differential phase data 322 corresponding to the location of the optical coupler 152(i+1), then the DSP 128 can conclude that the fiber event occurred at a location that is somewhere (i) downstream of the coupler 152(i) and (ii) at or upstream of the coupler 152(i+1).

In one possible implementation, the DSP 128 can be configured to conclude that a fiber event 332 has occurred when the variance of the differential phase data 322 for a location d over a specified duration exceeds a specified variance threshold level. Other implementations may apply other criteria for detecting fiber events, including but not limited to thresholding the magnitude of the change in the differential phase data 322 over a specified duration. A possible alternative criterion would be to search for a significant value or a significant change in the value in the power spectral density of the differential phase data 322, for example, the occurrence of a spectral peak.

In single-carrier DAS/DVS systems using excitation codes, the segment size (i.e., the native spatial resolution) ©d is given by the symbol rate $F_{symb}$ of the probing code: $©d=c_{fiber}/(2F_{symb})$, where $c_{fiber}$ stands for the celerity of light in the fiber.

As described earlier, the optical sensing system 100 of FIG. 1 employs an optical modulation scheme based on four digital coding sequences comprising BPSK codes for each of the X and Y polarization axes. Other embodiments are possible. For example, an alternative optical sensing system could employ an optical modulation scheme based on only two digital coding sequences comprising BPSK codes for only one polarization axis. For such an embodiment, only two digital-coded analog signals 111 would be used by the MZ modulator 116 to modulate only one polarization of the source laser signal 115b to generate the probing signal 119. Such an embodiment would still have four ADCs 126 to digitize the four analog signals 125 recovered from the combined reference and feedback signals 131+161, and the DSP 128 could still have the architecture of FIG. 3.

As another example, another alternative optical sensing system could employ an optical modulation scheme based on two pseudo-random digital coding sequences: one for each of the X and Y polarization axes. Here, too, only two digital-coded analog signals 111 would be used by the MZ modulator 116 to modulate the X and Y polarizations of the source laser signal 115b to generate the modulated optical probing signal 119. Here, too, such an embodiment would still have four ADCs 126 to digitize the four analog signals 125 recovered from the combined reference and feedback signals 131+161, and the DSP 128 could still have the architecture of FIG. 3.

As yet another example, yet another alternative optical sensing system could employ an optical modulation scheme based on only one pseudo-random digital coding sequences applied to only one of the X and Y polarization axes. Here, only one digital-coded analog signal 111 would be used by the MZ modulator 116 to modulate only one polarization of the source laser signal 115b to generate the modulated optical probing signal 119. Here, too, such an embodiment would still have four ADCs 126 to digitize the four analog signals 125 recovered from the combined reference and feedback signals 161, and the DSP 128 could still have the architecture of FIG. 3.

The optical sensing system 100 and the CUT 170 of FIG. 1 could be used as a sensor designed to detect external events that produce fiber events in the CUT 170, such as earthquakes, passing trains, car/pedestrian traffic, intrusions in sensitive areas, etc. The optical sensing system 100 and the CUT 170 could also be used to as a sensor to detect the presence of certain chemicals that impact the differential phases of the reflected optical signals. Such chemical events may result in a single temporal differential phase change rather than multiple differential phase changes over time. In that case, such fiber events can be detected by thresholding the temporal differential phase change rather than thresholding variance.

Embodiments have been described that employ a polarization-multiplexed probing sequence and a dual-polarization coherent optical receiver 120 having a dual-polarization 90-degree hybrid coherent mixer 122 that generates eight optical component signals 123 and four O-to-E converters 124 that generate four digital signals 125. Alternative embodiments can employ (i) a single polarization probing sequence and a coherent optical receiver having a single-polarization 90-degree hybrid coherent mixer that generates four optical component signals and (ii) an O-to-E converter that generates only two digital signals. In that case, the DSP 128 would be able to generate only scalar complex results, instead of full Jones matrices, from which noisier (e.g., due to polarization fading in the feedback signal 161) differential phase estimates could be extracted.

Although embodiments have been described that detect fiber events based on differential phase data, in alternative embodiments, fiber events can be detected based on state of polarization (SOP) data. For example, the DSP 128 can be configured to monitor the SOP data for temporal variations that indicate the occurrence of fiber events. SOP data is estimated from the full Jones matrix. SOP is commonly represented as a Stokes vector (a set of 4 values describing the polarization state of an electromagnetic field). The impact that a Jones matrix J has on a Stokes vector can be given by computing all or part of the 4×4 Mueller matrix M as M=A where is the tensor Kronecker product and $$A = \begin{bmatrix} 1 & 0 & 0 & 1 \\ 1 & 0 & 0 & -1 \\ 0 & 1 & 1 & 0 \\ 0 & -i & i & 0 \end{bmatrix}.$$

Various modifications of the described embodiments, as well as other embodiments within the scope of the disclosure, which are apparent to persons skilled in the art to which the disclosure pertains are deemed to lie within the principle and scope of the disclosure, e.g., as expressed in the appended claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. An apparatus comprising:
    an optical cable comprising a forward fiber, a feedback fiber, and multiple pairs of optical couplers, the optical couplers of each pair interconnecting nearby portions of the forward and feedback fibers;
    an optical transmitter configured to transmit an optical probing signal to the forward fiber to test the optical cable, wherein the couplers along the forward fiber provide tapped portions of the probing signal to couplers along the feedback fiber to form a combined optical feedback signal in the feedback fiber;
    a reference coupler connected between the transmitter and the forward fiber to tap an optical reference signal from the probing signal;
    a feedback coupler connected to combine the reference signal and the feedback signal; and
    an optical receiver configured to receive and process the combined reference and feedback signals from the feedback coupler to detect fiber events along the optical cable.

2. The apparatus of claim 1, wherein the optical cable further comprises one or more optical amplifiers along the forward fiber.

3. The apparatus of claim 1, wherein the optical cable further comprises one or more optical amplifiers along the feedback fiber.

4. The apparatus of claim 1, wherein the optical cable comprises two or more forward fibers, each having optical couplers; and wherein the transmitter is configured to generate different optical probing signals for the different forward fibers and the receiver is configured to receive and process different combined reference and feedback signals for the different forward fibers.

5. The apparatus of claim 1, wherein the probing signal is an optical pulse.

6. The apparatus of claim 1, wherein the probing signal is a binary-coded optical signal.

7. The apparatus of claim 1, wherein the probing signal is a dual-polarization digital sweep signal.

8. The apparatus of claim 1, wherein:
    the optical transmitter comprises:
        a laser source configured to generate a laser signal;
        an optical coupler configured to tap off a tapped portion of the laser signal for forwarding to the optical receiver; and
        a modulator and an amplifier configured to modulate and amplify another portion of the laser signal using one or more digital coding sequences to generate the probing signal; and
    the optical receiver comprises:
        an optical mixer configured to mix the tapped portion of the laser signal with the reference and feedback signals to generate component optical signals;
        optical-to-electrical converters and analog-to-digital converters configured to generate digital electrical signals from the component optical signals; and
        a digital signal processor (DSP) configured to process the digital electrical signals to detect the fiber events along the optical cable.

9. A method to detect
    fiber events along an optical cable under test, the optical cable comprising a forward fiber, a feedback fiber, and multiple pairs of optical couplers, the optical couplers of each pair interconnecting nearby portions of the forward and feedback fibers, the method comprising:

from an optical transmitter, transmitting an optical probing signal to the forward fiber such that the couplers along the forward fiber provide tapped portions of the probing signal to the corresponding couplers along the feedback fiber to form a combined optical feedback signal in the feedback fiber;

producing an optical reference signal by tapping a portion from the transmitted probing signal;

combining the optical reference signal and the feedback signal received from the feedback fiber; and processing the combined reference and feedback signal to detect fiber events along the cable under test.

10. The method of claim 9, wherein the probing signal is a binary-coded optical signal.

11. The method of claim 9, further comprising:

modulating a portion of a laser signal to produce the optical probing signal;

mixing another portion of the laser signal with the reference and feedback signals to generate component optical signals;

optically-to-electrically converting the component optical signals to digital signals; and processing the digital electrical signals in a digital signal processor to detect the fiber events along the optical cable under test.

\* \* \* \* \*